3,235,441
RADOME AND METHOD OF MAKING SAME
Melvin F. George, Jr., North Hollywood, Eli Simon, Los Angeles, and Edward H. Burkart, North Hollywood, Calif., assignors to Lockheed Aircraft Corporation, Burbank, Calif.
Filed Aug. 22, 1956, Ser. No. 605,668
23 Claims. (Cl. 161—161)

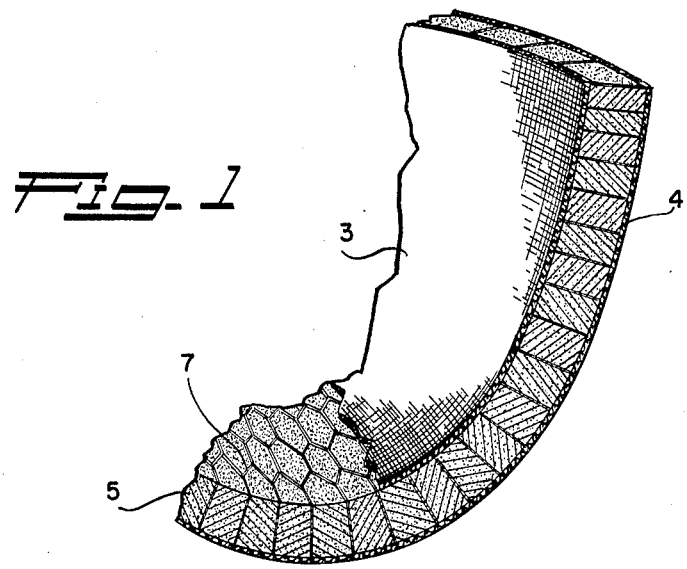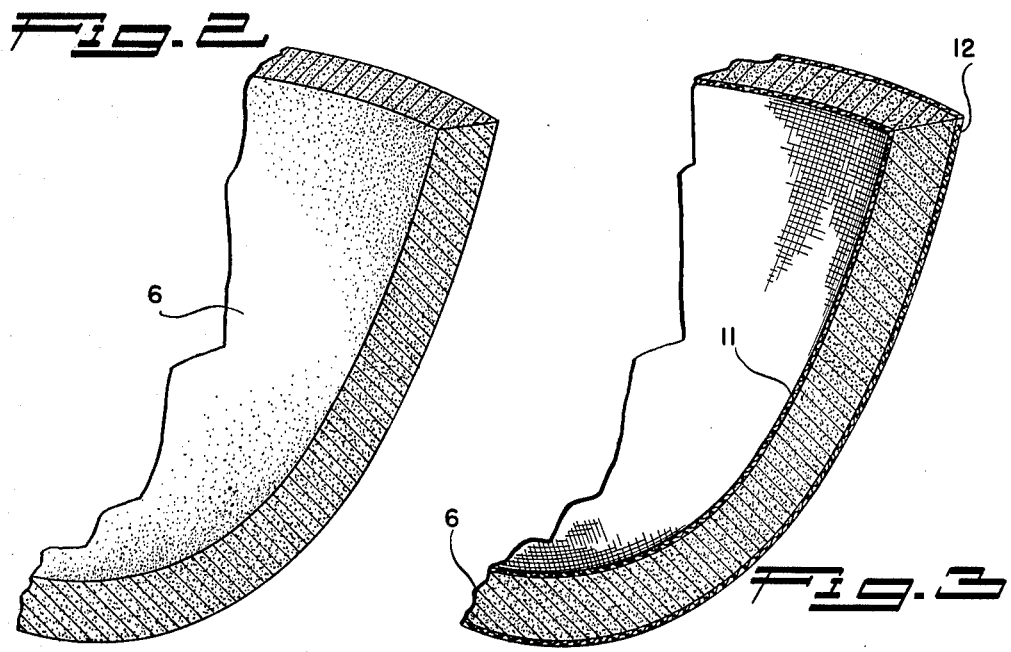
INVENTORS
MELVIN F. GEORGE JR.
ELI SIMON
EDWARD H. BURKART
By
Agent INVENTORS
MELVIN F. GEORGE JR.
ELI SIMON
EDWARD H. BURKART
By *George C. Sullivan*
  Agent United States Patent Office 3,235,441
Patented Feb. 15, 1966

This invention relates generally to enclosures through which electrical energy may be efficiently transmitted and more particularly to a laminated, electrically homogeneous radome construction and method of making the same in which any desired dielectric constant within reasonable limits may be obtained.

This is a continuation-in-part of a co-pending application, Serial Number 544,238, filed November 1, 1955, now issued as Patent No. 3,079,289.

The presently available material for constructing minimum beam distortion, low loss radomes having a needle nose or sharp leading edge configuration such as are required on high speed aircraft is a solid fiberglass-polyester laminate which is a high density material and unsatisfactory from a weight standpoint. This is particularly evident with fighter aircraft where a decrease in weight at times becomes mandatory due to lower fuel consumption rates together with the requirement for long range operation.

The severe weight penalty imposed by the use of solid fiberglass laminates as radome material for aircraft may be avoided on slower, subsonic aircraft which will accommodate blunt leading edge or low aspect radome configurations wherein the angle, commonly referred to as the incidence angle, between the direction of energy propagation and a line normal to the radome at the point of intersection, is low. In such radome configurations it is possible to use a sandwich construction in lieu of the solid fiberglass-polyester laminates. The sandwich construction is usually a low dielectric constant, low loss honeycomb cellular core interposed between outer skins of higher dielectric constant fiberglass laminate. This construction has a relatively low density and is electrically efficient so long as the angle of incidence of the energy beam with respect to the radome is low. As the incidence angle increases, however, transmission efficiency decreases and beam distortion becomes more severe. At the higher incidence angles introduced by the streamlined radome configurations which are used on high speed aircraft, the non-homogeneous sandwich construction is electrically unsatisfactory and the solid fiberglass type radome construction must be employed according to the prior art teachings even though it is inefficient weight-wise.

An object of this invention is to provide a radome and method of making the same with artificially prepared high dielectric constant material which is electrically homogeneous so that substantially no increase in losses or change in dielectric constant due to changes in the angle of incidence of electrical energy passing therethrough is brought about.

Another object of this invention is to provide a radome and method of making the same in which any desired dielectric constant within reasonable limits may be obtained. In accordance with the teachings of this invention, the radome may be designed to meet the requirements for a specific dielectric constant and in a controllable manner. This is not true of conventional radomes. The fiberglass polyester laminate commonly employed exhibits a dielectric constant of approximately four which is not variable to any substantial degree.

Another object of this invention is to provide a low density radome construction which exhibits a low loss tangent or dissipation factor favorably comparable with that of the fiberglass polyester laminate radome.

Another object of this invention is to provide a low density radome which is substantially insensitive to frequency over a range of 0 to 10,000 megacycles or more in regard to either the dielectric constant or dissipation factor.

Another object of this invention is to provide a radome and method of making the same wherein the desired dielectric constant may be obtained in an easily controlled manner so that in production the radomes may dependably exhibit substantially identical electrical properties.

Another object of this invention is to provide a radome construction which is electrically homogeneous and exhibits a stable dielectric constant over a wide temperature range.

Another object of this invention is to provide a radome and method of making the same wherein any desired dielectric constant within reasonable limits may be obtained with substantially no variation in weight.

Still another object of this invention is to provide a radome which may be molded to any desired shape or configuration without use of heavy equipment. No pressure is required or developed in practicing the method.

Further and other objects will become apparent from the reading of the following description, especially when considered in combination with the accompanying drawing wherein:

FIGURE 1 is a fragmentary view showing a radome constructed in accordance with the teachings of this invention;

FIGURE 2 is a fragmentary view showing a modified construction for the radome;

FIGURE 3 is a fragmentary view showing still another modified construction for the radome;

Figure 4:
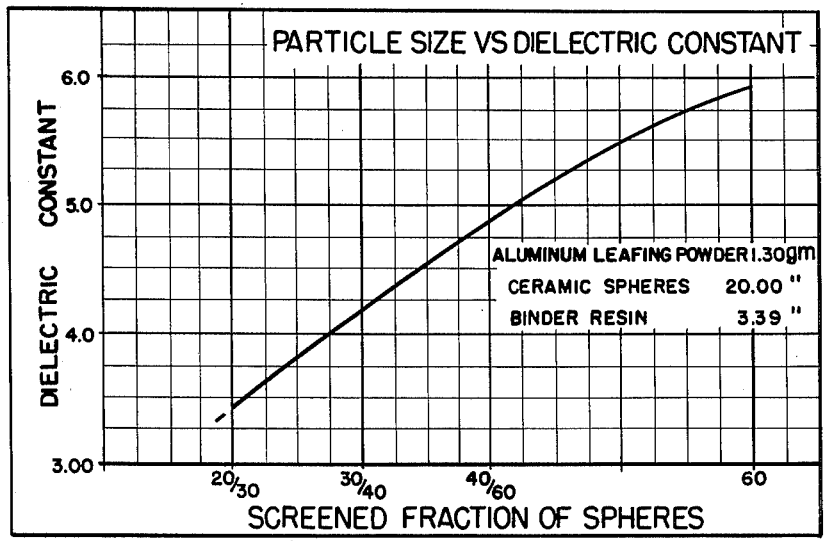
FIGURE 4 shows graphically the variation in dielectric constant obtainable by varying the particle size of the pellet constituent in the radome.

Referring to FIGURE 1, the radome construction according to the preferred embodiment includes a honeycomb or cellular core 7 of paper or the like which is interposed between outer skins 3 and 4 of fiberglass polyester laminate material or the like having a dielectric constant in the neighborhood of that desired for the radome and sufficient strength to permit use of the structure in its intended environment without substantial deformation. The cavities in cellular core 7 are filled with a high dielectric constant material of the type hereinafter described to provide a light weight high strength interlayer construction having homogeneous electrical properties, allowing the structure to act electrically in the same manner as a solid fiberglass polyester laminate radome while being much lighter in weight. The honeycomb core 7 in cooperation with outer skins 3 and 4 provide rigidity and high strength while the high dielectric constant material filling the cellular cavities produces the desired electrical characteristics for efficient use as a radome.

The high dielectric constant material in the radome is prepared by the external application of finely divided metal leafing powders to nominally low dielectric constant spherical pellets.

The range of the dielectric constant obtainable is approximately 1.8 to 9 when a hollow or internally porous spherical core material is used. This range is considered adequate for all practical purposes; however, the low end can be reduced to approximately 1.2 if desired by using either organic spheres or lower density inorganic materials. Prior to coating, the spheres are essentially in their final state of density; they are preferably light in weight and may exist in various stages of subdivision from less than 0.0001 inch to more than 0.125 inch diameter but preferably from .0002 inch to 0.060 inch diameter. The spheres may vary considerably in composition from organic to inorganic, it being preferred however, that the outer surface be relatively nonporous to facilitate coating.

The spheres which serve as the light weight matrix in the composition may be selected from the following list, which is intended to be illustrative only.

(1) Expanded montmorillonite (a principal constituent of bentonite and fuller's earth).
(2) Expanded montmorillonite internally pigmented with dielectrically modifying agents such as titanium dioxide, iron oxide, calcium oxide, and barium titanate.
(3) Expanded resins such as phenolics, Epons, polyurethanes, and polystyrenes.
(4) Expanded silicates such as the sodium, potassium silicates, or their mixtures with and without modifying constituents.
(5) Expanded or light weight oxides such as $Al_2O_3$ and $SiO_2$.

While much work on the artificial high dielectric constant materials has involved two ceramic hollow sphere materials, it was shown that other materials of similar size and shape could be utilized. Some work using acrylic molding powder such as a compressive molding grade of methylmethacrylate resin indicated that the resulting dielectric constant is not dependent on the raw material of the sphere. Similar results were obtained using a spherical Lotus seed. Thus, the spherical pellets which serve as the filler or matrix in the composition are not limited to any one material or type of material but rather to an approximate shape. Actually, all the particles are not perfect spheres but all would be considered approximately spherical.

The apparent density of the spherical pellets is of interest in aircraft applications, but it is not a controlling factor in obtaining a desired dielectric constant. Pellet size however, does affect the resulting dielectric properties. For practical reasons a sphere diameter ranging between .010 inch and .025 inch is preferred. This corresponds approximately to a 30–60 mesh screen fraction. While the above sphere size is preferred it is possible to successfully dielectrically modify particles as small or smaller than .0002 inch diameter or above .064 inch diameter.

The preferred material for the spherical pellets employed in this invention is prepared from suitable clays such as montmorillonite wherein the clay is ground, screened, suspended in air and fired by mixing with gas and burning. Simultaneous expansion and glazing of the clay particles occurs to form spherical, light weight, hollow or internally porous glazed balls suitable for metal coating. Such a unicellular spherialized clay product is produced by the Kanium Corporation, for an example, under the trade name "Kanamite."

Metallic pigments which are plate-like are most suitable for coating and dielectrically modifying the spherical pellets. Among these are aluminum leafing powder, copper bronzing powders and other materials such as zinc, stainless steel, etc. Particle size is important as well as particle shape. From experimental work it has been shown that the effectiveness of the addition of metallic leafing powders to the matrix spheres is related to the volume and number of platelets added and not weight (where materials of different densities are being compared). An extra fine 400 mesh aluminum leafing powder commercially identifiable as (MD7100) having an approximate major dimension of .0004 inch and an approximate thickness of .000005 inch is preferred for coating the pellets though other metal powders and other particle sizes and shapes will produce good results.

Various resinous binders for applying the metal leafing powder to the spherical pellets and for cementing the pellets together have been successfully used, among which are the following: Epoxies, polyesters, polystyrene, styrene-polyesters, silicones, etc. Likewise, it is feasible to utilize inorganic binders in order to extend the thermal properties of the artificial dielectric material.

Silicone resins are particularly efficacious in formulating the dielectric material. These binders are stable at temperatures as high as 600° F. with substantially no changes occurring in either the physical or electrical properties.

As a matter of convenience, blends of resins may be used in binding the pellets and metal leafing powder, i.e., the precoating procedure as hereinafter described, may use epoxies with a secondary binder of silicones or vice versa.

In general, the type of binder resin does not significantly influence the resulting dielectric constant obtained from a given formulation of metal powder, spherical pellets and resins. It should be noted however, that the technique of applying the metal leafing powder is significant in that it influences the dielectric constant and radar loss characteristics of the material.

While the resin serves primarily as a binding medium and as stated above, does not as a general rule significantly influence the dielectric constant, the silicone resin binders are exceptions. These materials with equivalent metal-pellet ratios, produce dielectric constants somewhat higher than when other types of resin binders are employed. This is graphically illustrated in FIGURE 5.

Three basic methods for preparing the artificial dielectric material from the metal powder, pellet and resin components have been used—all successfully. These procedures are listed as follows:

(1) Batch mixing using liquid resin binder—such as "epoxies," polyesters, etc.
(2) Precured-precoated pellets mixed with liquid resin or resin solution and compacted and cured.
(3) Precured-precoated pellets coated with a second resin which may be a non-tacky solid at ordinary temperatures but when heated, will fuse and cure. In this class fall certain epoxy, phenolic, polyester, silicone, etc., resins.

Preparation of controlled dielectric core material may be accomplished in single or multiple step operations. For example, in a single step operation, a weighed amount of the expanded ceramic material or pellets may be mixed directly with the metal pigment and binder resin and after a thorough mixing the mixture may be packed between fiberglass laminates, free to form blocks or in any other suitable manner and then cured. The curing condition will depend on the binder resin and catalyst used. It is possible to have either room temperature or heat curing compositions.

Figure 5:
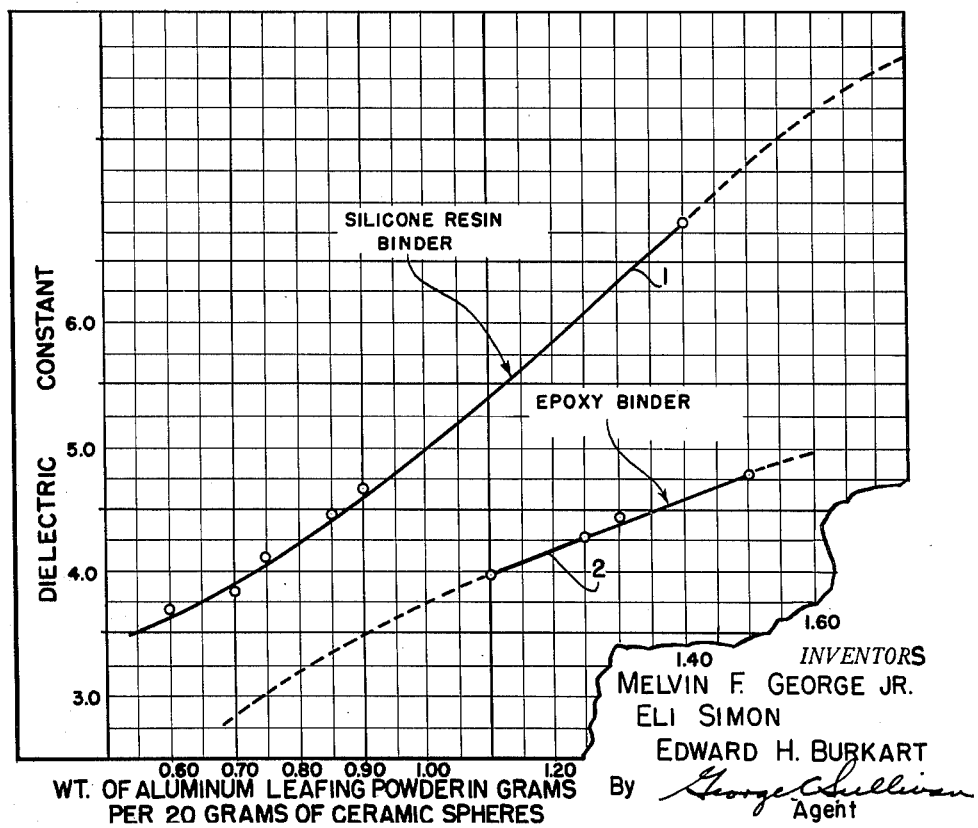
FIGURE 5 shows graphically the effect of two different binding resins on the dielectric constant of the radome.

A multiple step operation may be desirable in using the dielectric material wherein the pellets are precoated with a minimum of binder resin together with the desired amount of metal leafing powder and then thoroughly mixed, preferably with sufficient solvent to permit uniform coating of each particle. Then, after the excess solvent has evaporated, the coated pellets are cured. At this stage the matterial can be carefully checked for electrical properties and used either as a dry pack or mixed with more of the same, or different, binder resin to prepare compacted core material of substantially the same electrical properties as the pre-coated, pre-cured pellets. An exception should be noted here however when silicone resins are used as the binder. As hereinabove mentioned, and as illustrated in FIGURE 5, such resins appear to have a definite secondary effect in increasing the dielectric constant. Therefore, this affect must be taken into account when using the silicone resins, to dependably produce a dielectric material having the desired electrical properties.

It has been found advantageous to incorporate a small amount of solvent during the mixing operation to facilitate coating of the metal leafing powder on the ceramic pellets. This solvent may be removed prior to packing the material, or if desired, it may be left in the mixture to help handling and packing.

In order to obtain intermediate dielectric constants from precoated preparations as obtained from using the multiple step method, it is possible to blend various batches together. Also, it has been found useful to blend pre-coated batches with the uncoated pellets or with the metal leafing powder and binder resin or with mixtures thereof to obtain intermediate dielectric constant material. This blending permits close control with regard to the electrical characteristics of the final product. Where identical final compositions are used, the dielectric constant of the material produced is essentially the same regardless of the method by which the ingredients are mixed.

The effect of pellet size on the dielectric constant of the final product using a fixed ratio by weight of aluminum leafing powder, pellets and resin is graphically illustrated in FIGURE 4. As is apparent from this figure, the dielectric constant increases almost linearly with a decrease in the size of the spherical pellets up to a point at which the pellet size exceeds a mesh screen fraction of approximately 60 (this corresponds to a pellet diameter of approximately .010 inch), at which point a further decrease in the pellet size becomes less effective in increasing the dielectric constant.

The increase in dielectric constant due to increasing the concentration of metal leafing powder is shown by FIGURE 5. Curve 1 in FIGURE 5 represents a mixture employing a silicone resin binder while curve 2 represents a mixture employing an epoxy resin binder commercially identified as Epon 828. Equivalent amount of binder resin were used for a given weight of pellet and metal leafing powder in developing curves 1 and 2. From this figure it is readily apparent that the silicone resins are the preferred binder since it adds to the effectiveness of the metal leafing powder in producing any desired dielectric constant within a relatively wide range.

Examples of specific mixtures of pellets, metal leafing powder and binder resins are listed hereinbelow together with the resulting dielectric constant of each mixture.

*Example I*

| | Grams |
|---|---|
| Expanded ceramic (montmorillonite) pellets (20–80 mesh) | 20.00 |
| Extra fine 400 mesh aluminum leafing powder (MD7100), approx. major dimension .0004 inch, approx. thickness .000005 inch | 2.00 |
| Epon 828 binder resin | 5.65 |

This mixture resulted in producing a dielectric constant of 4.9. By reducing the weight of the leafing powder in the above mixture to 1.50 grams and the weight of the binder resin to 3.39 grams, a dielectric constant of 4.2 was obtained.

*Example II*

| | Grams |
|---|---|
| Expanded ceramic (montmorillonite) pellets (20–80 mesh) | 20.00 |
| Large particle aluminum leafing powder (140M) having an approx. major dimension of .0012 inch and an approx. thickness of .00003 inch | 2.00 |
| Epon 828 binder resin | 5.65 |

This mixture resulted in producing a dielectric constant of 3.95. By increasing the weight of the leafing powder in the mixture to 4 grams, the dielectric constant increased to 5.81.

*Example III*

| | Grams |
|---|---|
| Expanded ceramic (montmorillonite) pellets (20–80 mesh) | 20.00 |
| Copper-bronze leafing powder (comparable volume to 1.30 grams of aluminum) | 4.00 |
| Epon 828 binder resin | 3.39 |

This mixture resulted in producing a dielectric constant of 3.89. As is apparent by comparing Example III with Examples I and II the aluminum leafing powder is more effective in producing a high dielectric constant material than is the copper-bronze leafing powder when compared on a weight basis. When compared on a volume basis however, there appears to be little difference between leafing powders.

*Example IV*

| | Grams |
|---|---|
| Pellets of acrylic molding powder (30–40 mesh) | 22.20 |
| Aluminum leafing powder (MD7100) | 1.30 |
| Epon 828 binder resin | 3.40 |

This mixture produced a dielectric constant of 4.6. Note that the pellet material here is different from that used in the first three examples, though of substantially the same mesh screen fractions.

*Example V*

| | Grams |
|---|---|
| Lotus seed pellets (20–30 mesh) | 40.00 |
| Aluminum leafing powder (MD7100) | 1.30 |
| Epon 828 binder resin | 3.40 |

This mixture produced a dielectric constant of 4.9. It should be noted that 40 grams of the lotus seed pellets is comparable in volume to approximately 20 grams of the expanded ceramic pellets.

The above examples serve to not only illustrate typical mixtures on a quantitative basis but they also help to support the facts brought out hereinabove wherein the dielectric constant obtainable is substantially independent of the pellet material while being largely dependent on pellet size and the kind and amount of metal leafing powder used.

An important feature of the high dielectric constant material in the radome is the relative ease with which it may be handled and molded into a desired configuration. In making the radome shown in FIGURE 3 the material is poured into the open cells of a honeycomb core 7 of paper or the like which is interposed between outer skins 3 and 4. After the high dielectric constant material is poured in place, it is cured to form the light weight radome interlayer having homogeneous electrical properties allowing the structure to act electrically as a solid fiberglass-polyester laminate radome. Skins 3 and 4 may be bonded to the interlayer simultaneously with the curing of the binder resin in the high dielectric constant material or subsequently without changing the electrical characteristics of the radome.

Where the strength requirements will permit, radome 6 as illustrated in FIGURE 2 may be made entirely of the artificial high dielectric constant material by simply molding and curing the pellet, leafing powder and resin mixture in a mold of the desired shape.

A still further modification of the radome construction shown in FIGURE 1 is illustrated in FIGURE 3 wherein the artificial high dielectric constant material is interposed between outer skins 11 and 12 without the use of a cellular core reinforcing structure. The high dielectric constant material may be cured in situ or in a separate mold to provide the desired final radome configuration. When cured in situ with the outer skins 11 and 12 the resin binder employed in the artificial high dielectric constant material may be used to simultaneously bond the skins to the high dielectric constant core. Where the high dielectric constant material is cured in a separate mold, the outer skins 11 and 12 are subsequently secured to the preformed core of high dielectric constant material by a suitable resin. In connection with making the radome as shown in FIGURES 1 and 3, it may often be desirable to preform and only partially cure the resin in the high dielectric constant interlayer material and complete the curing in the process of laminating the outer skins thereto.

The skin forming either the inner or outer surface of either the FIGURE 1 or 3 radome may obviously be omitted where structurally feasible without departing from the teachings of this invention.

While certain preferred embodiments of the invention have been described herein and while examples of specific high dielectric constant mixtures have been given, it is entirely for purposes of illustration rather than limitation. Accordingly, it should be understood that certain alterations, modifications and substitutions such as those mentioned hereinabove may be made to the instant disclosure without departing from the spirit and scope of this invention as defined by the appended claims.

We claim:
1. A high dielectric constant radome through which electromagnetic energy may be efficiently propagated comprising, a mass of low dielectric pellets having an average diameter less than .125 inch, a metal coat surrounding each said pellet, and bonding means securing said pellets to said metal coating and to each other forming a unitary structure.

2. A high dielectric constant radome through which electromagnetic energy may be efficiently propagated comprising, a mass of nominally low dielectric pellets, a metal coating secured to the surface of said pellets, and an adhesive material securing the metal coated pellets together in a substantially contiguous relationship forming a unitary structure.

3. A high dielectric constant radome through which electromagnetic energy may be efficiently propagated comprising, a mass of nominally low dielectric pellets, a metal coating secured to the surface of said pellets, and means confining the metal coated pellets to the shape of the radome.

4. A low desnity, laminated radome through which electromagnetic energy may be propagated comprising, a mass of substantially spherical dielectric pellets, a metal coating secured to the surface of said pellets, a dielectric sheet, and bonding means securing a substantially uniform thickness layer of the metal coated pellets to the dielectric sheet.

5. A radome through which electromagnetic energy may be efficiently propagated comprising, a pair of spaced dielectric sheets, a mass of generally spherical pellets interposed between said sheets, a metal coating secured to the surface of said pellets, and means confining the mass of metal coated pellets between the spaced sheets.

6. A radome for aircraft for efficiently passing radio energy therethrough comprising, a pair of outer sheets of high dielectric constant material spaced apart and formed to the shape of the radome, and a mass of metal coated dielectric pellets interposed between the outer sheets and having a dielectric constant substantially equal to that of the sheets whereby the structure is substantially electrically homogeneous, said filler material being confined between the outer sheets and forming a unitary structure.

7. A radome for aircraft comprising, a pair of sheets of fiberglass laminate spaced apart and formed to the desired shape of the radome, a cellular reinforcing material interposed between the pair of sheets, and a mass of metal coated dielectric pellets occupying the cells of the reinforcing material and having a dielectric constant substantially equal to that of the sheets whereby the structure is electrically homogeneous, said filler and reinforcing material being bonded to the sheets and forming a unitary structure.

8. A method of making an electrically homogeneous radome for aircraft comprising, spacing a pair of sheets of dielectric material apart which have been formed to the desired shape of the radome, interposing a non-conducting cellular reinforcing structure between the pair of sheets, filling the cells of the cellular structure with a mass of metal coated dielectric pellets having a dielectric constant substantially equal to that of the sheets, and bonding the filler material to the reinforcing structure and sheets.

9. A method of making a light weight, electrically homogeneous sandwich type radome for aircraft comprising, mixing a plurality of generally spherical, low density pellets together with metal powder and a suitable bonding agent, spacing a pair of sheets of dielectric material apart which have been formed to the desired shape of the radome, inserting a cellular reinforcing structure between said sheets, inserting the pellet, powder and bonding agent mixture into the cavities of the cellular structure, and curing the bonding agent to bind the pellets and metal powder together and to the sheets and cellular structure.

10. A method of employing dielectric pellets in a light weight radome for aircraft comprising, mixing a plurality of the pellets together with metal powder and a suitable bonding agent, spacing a pair of sheets of fiberglass-polyester laminate apart which have been formed to the desired shape of the radome, inserting the pellet, powder and bonding agent mixture into the space between the sheets, and curing the bonding agent to bind the pellets and metal powder together and to the sheets whereby a high dielectric sandwich type radome structure is formed.

11. The process of preparing cored laminates comprising placing hollow beads coated with a heat-tackifiable resin and a powdered metal between the confines of outer skins and heating and compressing to compact the beads and to gel the resin.

12. The process of claim 11 wherein the heat-tackifiable resin is a silicone resin.

13. The process of claim 11 wherein the heat-tackifiable resin is a phenolic resin.

14. The process of claim 11 wherein the heat-tackifiable resin is an epoxy resin.

15. The process of claim 11 wherein the heat-tackifiable resin is an alkyd resin.

16. The process of claim 11 comprising a multiplicity of cores confined by spaced-apart outer skins.

17. A cored sandwich structure comprised of at least two spaced-apart skins containing therebetween a cellular core comprised of thin walled beads coated with a powdered metal and a thermosetting resin, said resin and powdered metal completely filling the voids between the beads in order to connect the beads with each other and the spaced-apart skins to form a complete sahdwich structure.

18. The product of claim 17 comprised of a multiplicity of cores confined by spaced-apart outer skins.

19. The product of claim 17 wherein the thermosetting resin is a silicone resin.

20. The product of claim 17 wherein the thermosetting resin is a phenolic resin.

21. The product of claim 17 wherein the thermosetting resin is an epoxy resin.

22. The product of claim 17 wherein the thermosetting resin is an alkyd resin.

23. A cored sandwich structure comprised of at least two spaced-apart skins containing there-between a cellular core comprised of thin walled beads coated with a powdered aluminum and a thermosetting resin, said resin and powdered aluminum completely filling the voids between the beads in order to connect the beads with each other and the spaced-apart skins to form a complete sandwich structure.

References Cited by the Examiner

UNITED STATES PATENTS

| | | | |
|---|---|---|---|
| 948,541 | 2/1910 | Coleman | 154—45.1 |
| 2,171,438 | 8/1939 | Tarbox | 154—14 |
| 2,639,252 | 5/1953 | Simon et al. | 154—100 XR |
| 2,744,042 | 5/1956 | Pace | 154—100 XR |
| 2,766,800 | 10/1956 | Rockoff | 154—52 |
| 2,806,509 | 9/1957 | Bozzacco et al. | 154—28 |

FOREIGN PATENTS 1,082,131   6/1954   France.

EARL M. BERGERT, *Primary Examiner.*

CARL F. KRAFFT, J. S. BAILEY, *Examiners.*